United States Patent
Tatera

(10) Patent No.: US 6,623,182 B2
(45) Date of Patent: Sep. 23, 2003

(54) HUNTER'S TREE-MOUNTED CAMERA MOUNT

(76) Inventor: Bruce Tatera, N6438 E. Paradise Rd., Burlington, WI (US) 53105

( * ) Notice: Subject to any disclaimer, the term of this patent is extended or adjusted under 35 U.S.C. 154(b) by 0 days.

(21) Appl. No.: 10/047,350

(22) Filed: Jan. 14, 2002

(65) Prior Publication Data

US 2003/0133708 A1 Jul. 17, 2003

(51) Int. Cl.$^7$ .................. G03B 17/00; H04N 5/225; F16M 11/04
(52) U.S. Cl. ................ 396/428; 248/217.4; 248/187.1; 348/373
(58) Field of Search .................. 396/428, 420, 396/421, 424, 427; 248/231.71, 229.15, 288.31, 229.23, 216.1, 282.1, 217.4, 156, 187.1, 176.2; 348/373, 787, 789, 825, 836

(56) References Cited

U.S. PATENT DOCUMENTS

| | | | | |
|---|---|---|---|---|
| 3,608,794 A | * | 9/1971 | Mazure | 224/255 |
| 4,079,908 A | * | 3/1978 | Davis | 248/156 |
| 4,924,972 A | * | 5/1990 | Westbrock | 182/187 |
| 5,491,919 A | | 2/1996 | Rather et al. | 42/94 |
| 5,626,322 A | * | 5/1997 | Braun | 248/282.1 |
| 5,664,750 A | | 9/1997 | Cohen | 248/231.71 |
| 5,669,592 A | * | 9/1997 | Kearful | 248/217.4 |
| 6,019,524 A | * | 2/2000 | Arbuckle | 396/427 |
| 6,347,779 B1 | * | 2/2002 | Korin | 248/499 |

OTHER PUBLICATIONS

Cabela's Internet Catalog, Redi–Reach Camera Mount, 2001.

* cited by examiner

Primary Examiner—Russell Adams
Assistant Examiner—Rochelle Blackman
(74) Attorney, Agent, or Firm—Jansson, Shupe & Munger, Ltd.

(57) ABSTRACT

A camera mount for mounting a camera to a tree trunk/limb in position such that an animal trail is within the field of view of the camera, the camera mount including an elongate member, such as screw member, having a distal portion insertable into the truck/limb and a proximal portion extending from the distal portion; and a mounting plate affixed to the proximal portion of the elongate member and adapted to support a camera in rotatably-adjustable positions. The apparatus provides mounting adaptability and multi-axis adjustability in a one-piece camera mount, despite variations in trunk/limb size/shape/orientation.

18 Claims, 2 Drawing Sheets

HUNTER'S TREE-MOUNTED CAMERA MOUNT

FIELD OF THE INVENTION

This invention is related generally to mounting devices, and in particular to devices for mounting cameras to trees for use in recording hunting encounters, such as in the sport of deer hunting.

BACKGROUND OF THE INVENTION

In the sport of hunting there are many situations in which it is useful to mount cameras in natural settings in positions to observe and record encounters with the hunted animals such as deer. During hunting trips, hunters often wish to either monitor a trail frequented by the animals being hunted or to make a video recording of the actual kill of the animal. In such situations, it is desirable to be able mount a camera (e.g., camcorder) easily to the tree in which a hunting stand is located or to a nearby tree, in a position such that the trail can easily be placed in the field of view of the camera. Mounting a camera to a tree trunk or the limb of a tree requires that the mount be able to be attached to a wide variety of shapes, sizes and orientations of tree members.

U.S. Pat. No. 5,664,750 (Cohen) discloses a camera mount which can be secured to a structure such as a tree trunk or tree limb. The mount described therein includes a base clamp portion and a plurality of flexible joints to enable the camera to be aimed in the desired direction no matter in what attitude the structure to which the base clamp is attached is oriented. This camera mount, however, is complex (requiring the adjustment of several joints) and costly (containing a large number of mechanical elements to provide its desired function).

Cabela's, a hunting, fishing and outdoor gear retailer and catalog company headquartered in Sidney, Nebr., sells a camera mount comprising a standard commercial camera mount combined with an archery bow holder which includes a telescoping arm with pivot joints secured to a tree trunk or limb with a belt. This combination bow holder and camera mount, sold under the name Redi-Reach, although providing a high degree of flexibility and adjustability, requires a number of assembly and setup steps to obtain the desired camera orientation, and is both bulky and quite expensive.

Despite the high degree of flexibility provided by these camera mounting products, there is a need for a simpler, more compact, and much lower cost adjustable camera mount for outdoor activities such as hunting.

OBJECTS OF THE INVENTION

It is an object of this invention to provide a simple, low-cost mount for mounting a camera to a tree.

Another object of the invention is to provide a camera mount which, while very simple, still provides a fully-sufficient range of camera positioning while accommodating the irregular shapes and orientations of tree trunks and limbs.

Another object of this invention is to provide a camera mount which can withstand heavy loads and which resists breakage both during use and during transport.

Another object of this invention is to provide an outdoor camera mount which is compact.

Another object of this invention is to provide an outdoor camera mount which is weather resistant and requires a minimum of maintenance.

These and other objects of the invention will be apparent from the following descriptions and from the drawings.

SUMMARY OF THE INVENTION

The instant invention overcomes the above-noted problems and shortcomings and satisfies the objects of the invention. The invention is a camera mount for mounting a camera (e.g., a camcorder or the like) to a wooden structure such as a tree trunk or the limb of a tree. The camera mount includes a screw member having a distal portion which is screw-insertable into the wooden structure and a proximal portion extending from the distal portion. A mounting plate is affixed to the proximal portion of the screw member and adapted to support a camera in rotatably-adjustable positions, thereby providing mounting adaptability and multi-axis adjustability in a one-piece camera mount.

In one embodiment of the inventive camera mount, the mounting plate includes a mounting hole. The mount further includes a threaded camera-mounting bolt for adjustably securing the camera to the mounting plate through the mounting hole.

In a preferred embodiment of the camera mount, the mounting plate includes a plurality of mounting holes to enable the camera to be mounted in different locations thereon.

In a particularly preferred embodiment, the inventive camera mount includes a grip member affixed to the proximal portion of the mount to facilitate insertion of the screw member into the structure. In some embodiments, the grip member is a handle which is affixed transverse to the screw member at the proximal portion of the screw member, an end remote from the distal portion.

In another preferred embodiment of the camera mount, the mounting plate extends from the handle toward the distal portion of the screw member. Further, in some embodiments, the mounting plate is affixed to the handle.

In another embodiment of the camera mount, the mounting plate is positioned to serve as a grip member to facilitate insertion of the screw member into the structure.

In another preferred embodiment of the camera mount, the mounting plate includes a threaded storage hole for storing the threaded camera-mounting bolt when not in use. In other embodiments, the threaded camera-mounting bolt is secured by a tether to prevent loss thereof.

In a particular embodiment of the camera mount, the distal end of the screw member is threaded with wood-screw threads, thereby facilitating insertion into the wooden structure in positions and orientations chosen by the user, such as a hunter.

In a particular embodiment, the camera mount is a hunter's camera mount for mounting a camera to a tree trunk/limb in a position such that an animal trail is within the field of view of the camera. The hunter's camera mount comprises a screw member having a distal portion screw-insertable into the truck/limb and a proximal portion extending from the distal portion and a mounting plate affixed to the proximal portion of the screw member and adapted to support a camera in rotatably-adjustable positions, thereby providing mounting adaptability and multi-axis adjustability in a one-piece camera mount, despite variations in trunk/limb size/shape/orientation.

More broadly considered, the invention includes (1) an elongate member having a distal portion insertable into the wooden structure (e.g., tree trunk or limb) and a proximal portion extending from the distal portion, and (2) a mounting plate attached at the proximal portion of the elongate member and adapted to support a camera in rotatably-adjustable positions, such that the device provides mounting adaptability and multi-axis adjustability for a camcorder or other camera in a one-piece camera mount.

The distal portion of the elongate member, i.e., the portion which is inserted into the wooden structure, is preferably a unitary structure. In some cases, however, the distal portion may include (1) a sleeved or other structure, one example being a hollow tubular (female) member which is pounded or otherwise inserted into the wooden structure, and (2) a male member inserted into the tubular member such that the male member is rotatably adjustable relative to the sleeve portion. The tubular member may be internally threaded while the male member is a bolt-like threaded member. In some cases, the tubular member may be left in place for future use. Various other sliding and rotating relationships and structures are possible.

In highly preferred embodiments, the elongate member and the mounting plate are a unitary structure. Alternatively, the elongate member and the mounting plate may be separate members which are removably and in some cases also rotatably attached to one another. In such embodiments, the elongate member may be left in place for future use.

Based in part on the recognition that nearly all photographic situations do not require immediate readjustment of all three degrees of freedom of camera orientation, the simple approach of the present invention is fully able of compensating for the non-uniformities of wooden structures such as tree trunks and limbs while providing the user completely adequate capability to adjust camera orientation.

DETAILED DESCRIPTION OF PREFERRED EMBODIMENTS

Figure 1A:
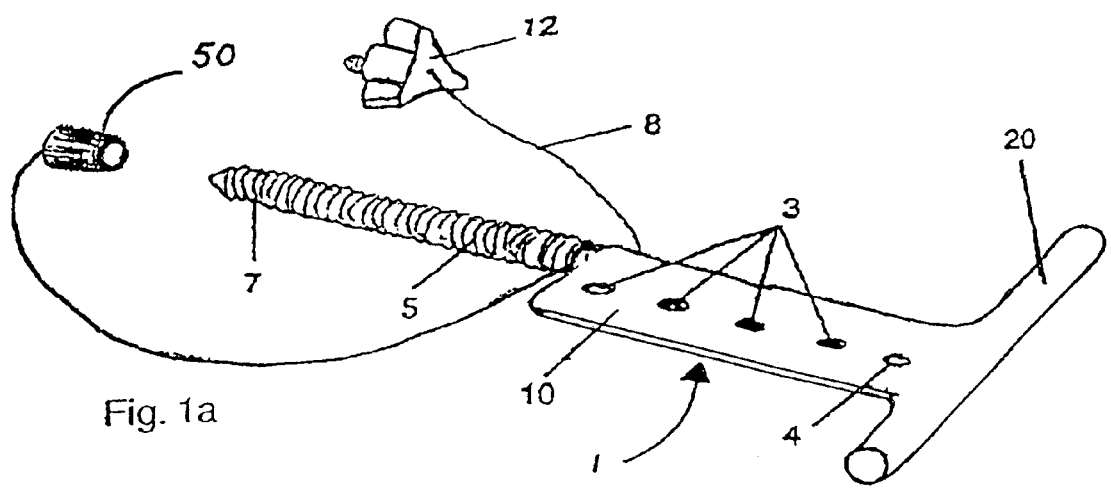
FIG. 1a is a perspective view of a preferred embodiment of the camera mount of the present invention.

Referring to FIG. 1a, a perspective view of a camera mount 1 is shown. Camera mount 1 has a screw member 5 which has a distal portion 7 which is threaded to enable screw-insertion of distal portion 7 into a wooden structure such as a tree trunk or limb. Camera mount 1 also has a grip member or handle 20 which is affixed to the proximal portion (not visible) of screw member 5. A mounting plate 10 is affixed to the proximal portion of screw member 5 and to handle 20, providing a rigid structure on which to mount a camera on mounting plate 10. Mounting plate 10 includes a plurality of mounting holes 3. (Four mounting holes are shown in FIG. 1a.) Camera mount 1 further includes a threaded camera-mounting bolt 12 which is secured by a tether 8 in order to prevent loss of the bolt during assembly and setup. A threaded storage hole 4 is also provided in mounting plate 10. The threaded portion of storage hole 4 is not visible in the drawing since it is below the top surface of mounting plate 10 as shown in the perspective view of FIG. 1a.

Figure 1B:
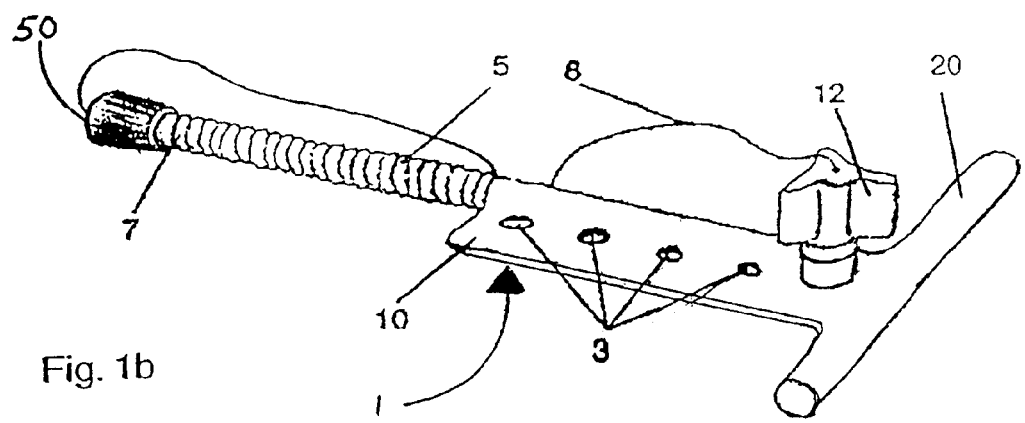
FIG. 1b is a second perspective view of a preferred embodiment of the camera mount of the present invention, with the camera-mounting bolt in the stowed position.

FIG. 1b is a similar perspective view of camera mount 1, showing threaded camera-mounting bolt 12 in the stowed position. All of the elements shown in FIG. 1a with the exception of storage hole 4, are also shown on FIG. 1b.

Figure 2:
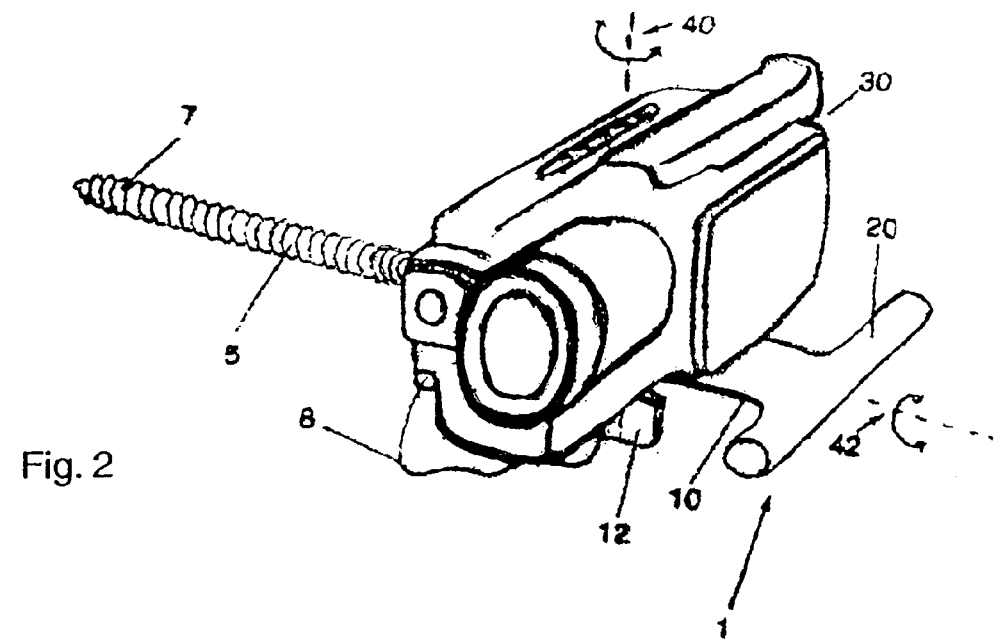
FIG. 2 is a perspective view of a second embodiment of the camera mount of the present invention. This embodiment combines the functions of the mounting plate and the grip member into a single structure within the camera mount.

FIG. 2 is another perspective view of camera mount 1, but with a camera 30 shown in a mounted position. Camera 30 is preferably a camcorder or a digital camera with a video recording mode, but may be other kinds of visual image recording devices. Again, many of the elements of camera mount 1 are shown. The axis of rotation 42 is the axis defined along the length of screw member 5. Axis 42 indicates that camera mount 1 provides angular adjustability around axis 42. In a similar fashion, the axis of rotation 40 is defined along the length of threaded-camera-mounting bolt 12 in its position securing camera 30 to camera mount 1 through one of the mounting holes 3. Axis 40 provides a second degree of angular adjustability to camera 30 on mount 1. The third independent degree-of-freedom is provided by the orientation at which screw member 5 is inserted into the wooden structure.

Figure 3:
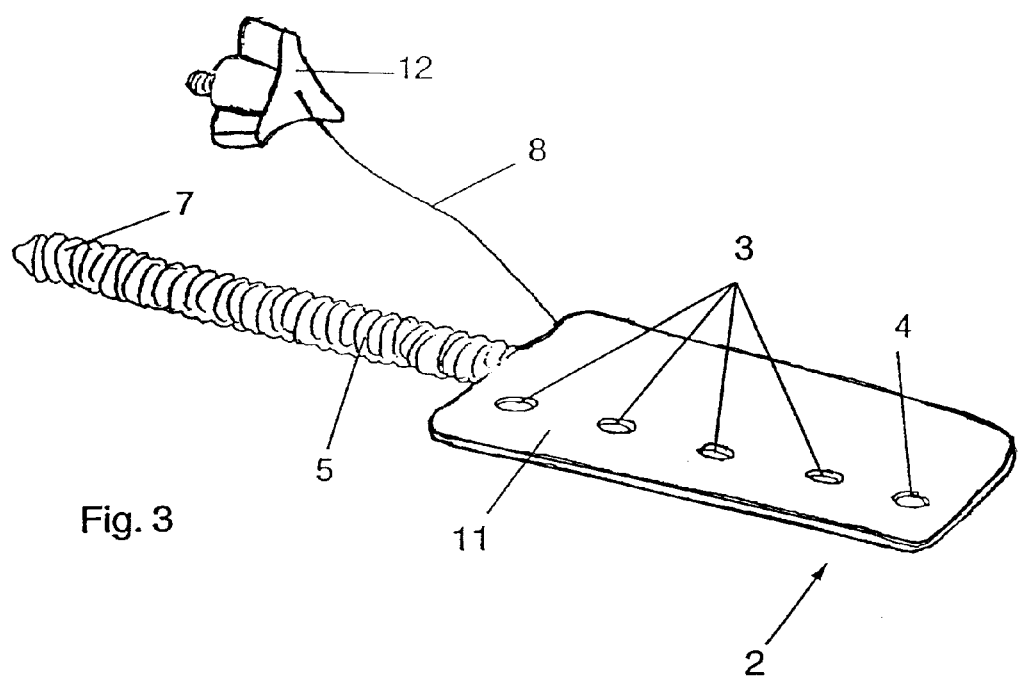
FIG. 3 is a perspective view of an alternate embodiment of the present invention, with the mounting plate serving as the grip member of the camera mount.

FIG. 3 is a perspective view of an alternate embodiment of the present invention. In this alternate embodiment, the camera mount 2 includes a mounting plate 11 which serves a the grip member of camera mount 2, replacing the function of handle 20 in each of the previous figures. Other elements of camera mount 2 are similar to the corresponding elements of camera mount 1.

As indicated above, a number of variations are possible and fall within the scope of the invention. Also, various features can be added for a number of reasons. Given that the camera mount of this invention is small and compact, and can be carried in a hunter's pocket, it is helpful to include a point cap 50, as illustrated in FIGS. 1a and 1b. Point cap 50 may be made of rubber or other material, and serves to protect the hunter from minor injury upon reaching into his pocket. Such cap can be tethered to the camera mount, as shown, in order to avoid loss.

While the structure of this invention have been described in connection with specific embodiments, it should be understood clearly that these descriptions are made only by way of example and are not intended to limit the scope of the invention.

What is claimed is:

1. A camera mount for mounting a camera to a wooden structure, comprising:

a screw member having a distal portion screw-insertable into the wooden structure and a proximal portion extending from the distal portion to an end remote from the distal portion;

a grip handle affixed to the end of the proximal portion to facilitate insertion of the screw member into the structure; and a mounting plate affixed to the proximal portion of the screw member and extending from the handle toward the distal portion of the screw member, the mounting plate being adapted to support a camera in rotatably-adjustable positions, thereby providing mounting adaptability and multi-axis adjustability in a one-piece camera mount.

2. The camera mount of claim 1, wherein:

the mounting plate defines a mounting hole; and the mount further includes a threaded camera-mounting bolt for adjustably securing the camera to the mounting plate.

3. The camera mount of claim 2 wherein the mounting plate includes a plurality of mounting holes to enable the camera to be mounted in different locations thereon.

4. The camera mount of claim 2 wherein the mounting plate further defines a threaded storage hole for storing the threaded camera-mounting bolt when not in use.

5. The camera mount of claim 4 wherein the threaded camera-mounting bolt is secured by a tether to prevent loss thereof.

6. The camera mount of claim 2 wherein the threaded camera-mounting bolt is secured by a tether to prevent loss thereof.

7. The camera mount of claim 1 wherein the mounting plate is affixed to the handle.

8. The camera mount of claim 1 wherein the mounting plate is positioned to serve as the grip handle to facilitate insertion of the screw member into the structure.

9. The camera mount of claim 1 wherein the distal end of the screw member is threaded with woodscrew threads, thereby facilitating insertion into the wooden structure in positions and orientations of choice.

10. A hunter's camera mount for mounting a camera to a tree trunk/limb in position such that an animal trail is within the field of view of the camera, the camera mount comprising:
- a screw member having a distal portion screw-insertable into the truck/limb and a proximal portion extending from the distal portion to an end remote from the distal portion;
- a grip handle affixed to the end of the proximal portion to facilitate insertion of the screw member into the structure; and
- a mounting plate affixed to the proximal portion of the screw member and extending from the handle toward the distal portion of the screw member, the mounting plate being adapted to support a camera in rotatably-adjustable positions, thereby providing mounting adaptability and multi-axis adjustability in a one-piece camera mount, despite variations in trunk/limb size/shape/orientation.

11. The camera mount of claim 10 wherein the mounting plate is affixed to the handle.

12. The camera mount of claim 10 wherein the distal end of the screw member is threaded with woodscrew threads, thereby facilitating insertion into the trunk/limb in positions and orientations of choice.

13. The camera mount of claim 10 wherein:

the mounting plate defines a mounting hole; and the mount further includes a threaded camera-mounting bolt for adjustably securing the camera to the mounting plate.

14. The camera mount of claim 13 wherein the mounting plate includes a plurality of mounting holes to enable the camera to be mounted in different locations thereon.

15. The camera mount of claim 13 wherein the mounting plate further defines a threaded storage hole for storing the threaded camera-mounting bolt when not in use.

16. The camera mount of claim 15 wherein the threaded camera-mounting bolt is secured by a tether to prevent loss thereof.

17. The camera mount of claim 13 wherein the threaded camera-mounting bolt is secured by a tether to prevent loss thereof.

18. The camera mount of claim 10 wherein the distal end of the screw member is threaded with woodscrew threads, thereby facilitating insertion into the tree trunk/limb in positions and orientations of choice.

* * * * *